July 1, 1930.  B. CYR  1,768,892
THERMOSTATIC CIRCUIT CONTROLLING APPARATUS
Filed Sept. 3, 1926  2 Sheets-Sheet 1
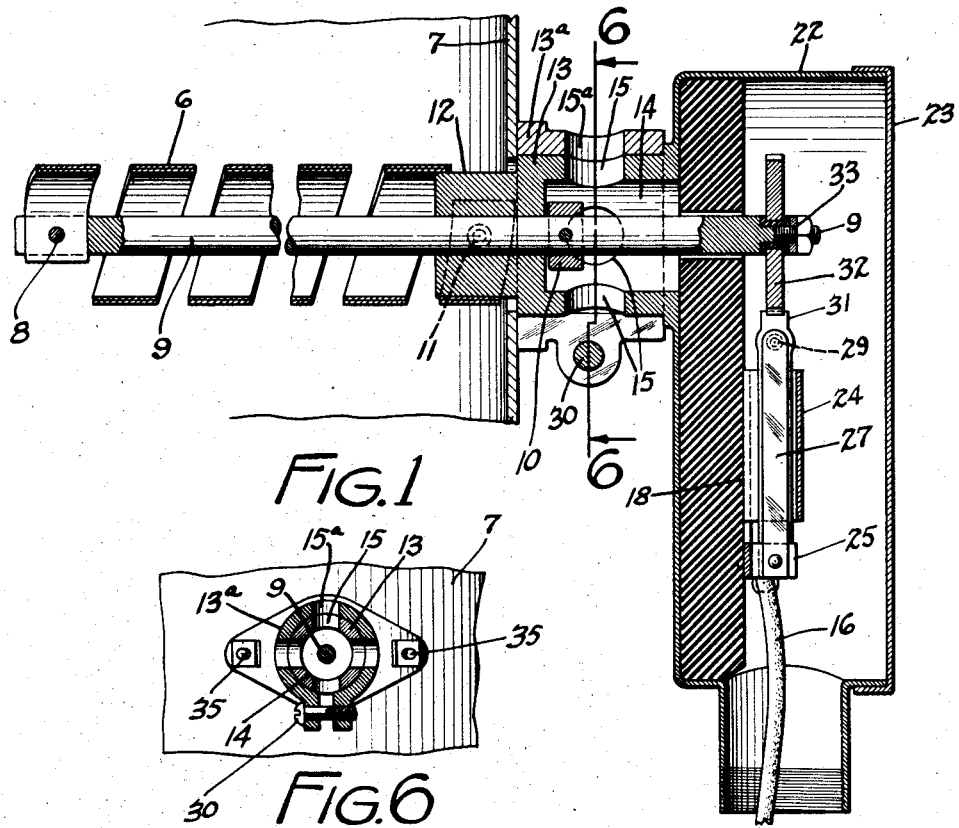
Fig.1
Fig.6
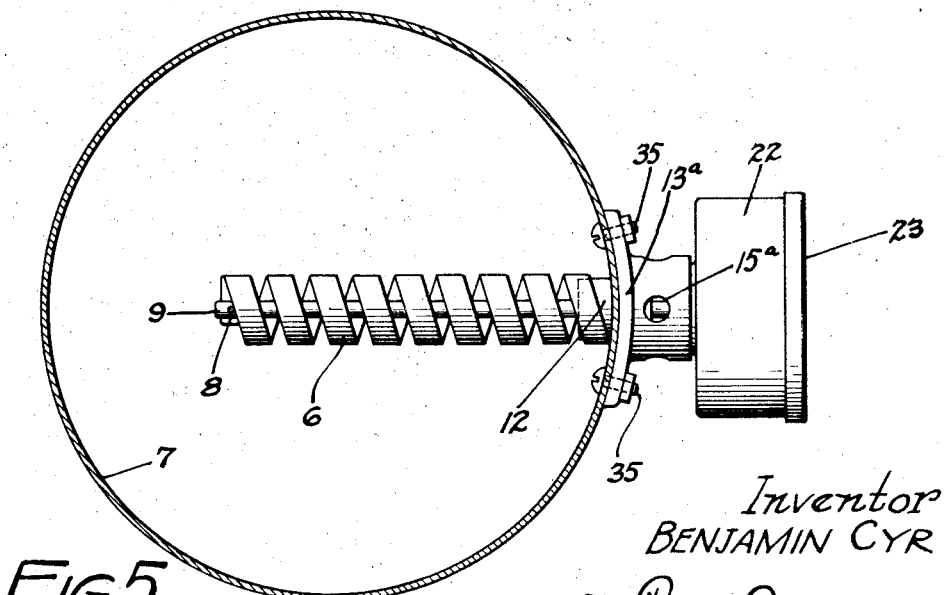
Fig.5
Inventor
BENJAMIN CYR
By *Paul, Paul & Moore*
ATTORNEYS July 1, 1930.  B. CYR  1,768,892
THERMOSTATIC CIRCUIT CONTROLLING APPARATUS
Filed Sept. 3, 1926   2 Sheets-Sheet 2

Inventor
BENJAMIN CYR

ATTORNEYS

Patented July 1, 1930

1,768,892

UNITED STATES PATENT OFFICE

BENJAMIN CYR, OF MINNEAPOLIS, MINNESOTA, ASSIGNOR, BY MESNE ASSIGNMENTS, TO MINNEAPOLIS-HONEYWELL REGULATOR COMPANY, OF MINNEAPOLIS, MINNESOTA, A CORPORATION OF DELAWARE

THERMOSTATIC CIRCUIT-CONTROLLING APPARATUS

Application filed September 3, 1926. Serial No. 133,413.

This invention relates to a thermostatic apparatus specifically adapted for the control of an electric circuit. It more particularly relates to an apparatus adapted to make and break an electric circuit in response to changes in temperature affecting the thermostatic element. It further relates to such an apparatus which is adapted to alter the condition of the circuit after a predetermined movement of the thermostatic element in response to a temperature change and to permit additional movement of such element responsively to said change without affecting the condition of the circuit.
An object of the invention is to provide a thermostatic circuit-controlling apparatus including a thermostatic element adapted to transmit rotary motion to a member in response to temperature changes in either direction, and the member having a toothed device terminally mounted thereon, and rotatable therewith, and arranged to alter the circuit after a predetermined rotation of the device in either direction, and to permit additional rotation of the device without affecting the condition of the circuit.

A further object of the invention is to provide an apparatus of the class described, including a housing for the switch mechanism having a support for a thermostatic element and a rotatable member connected therewith which member extends into the housing for connection with the switch mechanism, said support having a cavity therein traversed by the rotatable member, and further having a plurality of air-circulating passages in the wall thereof to permit circulation of air through the cavity to prevent the switch mechanism from becoming excessively heated.
The object, therefore, of this invention is to provide an improved thermostatic circuit-controlling apparatus.

Other objects of the invention will more fully appear from the following description and the accompanying drawings, and will be pointed out in the annexed claims.

In the drawings, there has been disclosed a structure designed to carry out the objects of the invention but it is to be understood that the invention is not confined to the exact features shown as various changes may be made within the scope of the claims which follow.

In the drawings:

Figure 1 is a vertical sectional view of the device taken on the line 1—1 of Figure 2, showing the air-cooling means;

Figure 5 is a plan view of the apparatus mounted on a smokestack; and

Figure 6 is a sectional view on the line 6—6 of Figure 1.

Figure 2:
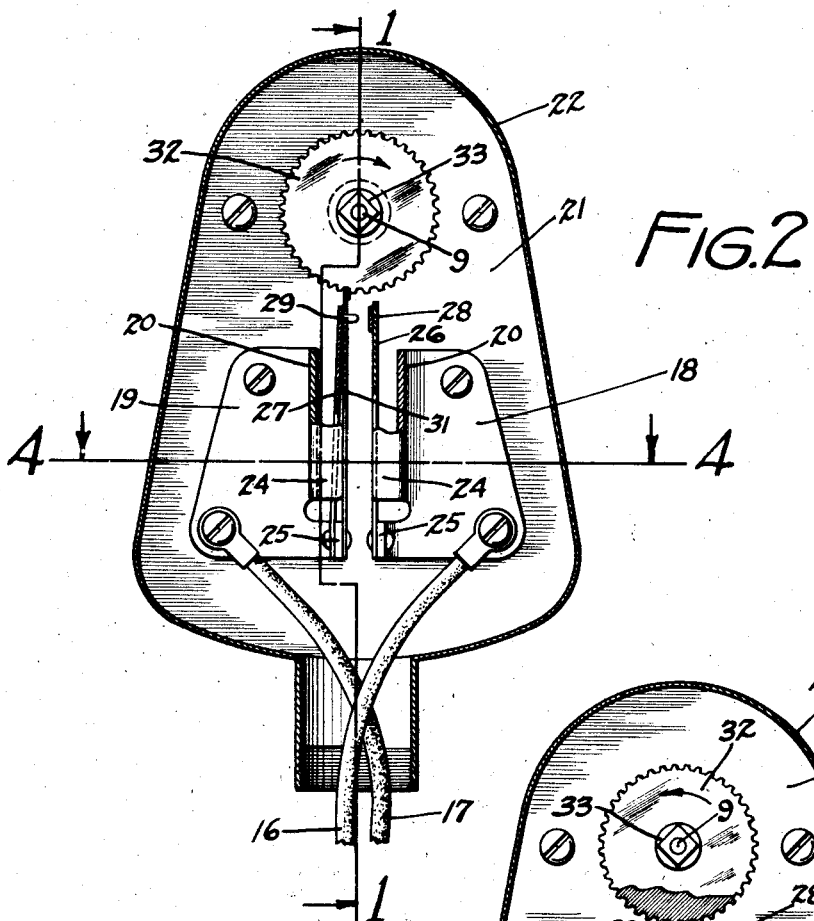
Figure 2 is a view in end elevation of the device with the cover removed and with parts broken away;

The structural embodiment of the invention here shown, for purposes of explanation, is one more particularly adapted for use with electrically operated fuel burners, and the apparatus is therefore shown with its thermostatic element 6 positioned for responses to variations in temperature within a space such as the interior of a smokestack 7. This thermostatic element is of ordinary construction, and consists of two ribbon-like pieces of metallic material suitably united and of different coefficients of expansion. One end of the thermostatic element 6 is connected by the rivet 8 to one end of a metallic rod 9 while the other end of the element is held by the rivet 11 to a head 12 integral with an extension 13 of the housing 22. The head 12 and extension 13 are axially bored to receive the rod 9 so that it may have rotary movement therein. This rotary movement is imparted to the rod 9 because of the differential in coefficients of expansion of the two ribbon-like pieces of the thermostatic element 6,—a torque being set up in the element with the result that the rod is rotated through its connection with the element at its outer end.

The extension has a recess or cavity 14 therein communicating with the atmosphere through a plurality of air-circulating passages 15 provided in the wall thereof. A collar 10 is pinned to the rod 9 within the recess 14 to hold it against longitudinal movement. The thermostatic element 6 is here shown as positioned within the smokestack 7, and the housing 22 is secured to the wall thereof by means of a flanged collar 13ª, bored to receive the extension 13, as shown in Figure 1. This collar is preferably split, and has a clamping screw 30 for clamping the extension 13 securely therein. It may be conveniently secured to the wall of the smokestack by bolts 35. The collar 13ª also has a plurality of air-circulating passages 15ª in the wall thereof, which are alined with the similar passages 15 in the extension 13, thus permitting free circulation of air through the recess 14, with the resultant cooling of the portion of the rod 9 traversing the recess. Such circulation of air through the recess 14, reduces to a minimum the conductivity of heat from the exposed portion of the rod 9 to the switch mechanism mounted within the housing 22. Also by mounting the apparatus upon the smokestack as above described, it may readily be removed therefrom, and its position with respect thereto may also be altered.

Operation of the rod 9 in response to changes in temperature functions, is affected through a suitable device having an operable connection with the electrical circuit to be controlled and functioning to make and break such circuit, and an important feature of the invention resides in the fact that after a predetermined movement of the rod by a change in temperature, the electrical condition of the circuit is changed, although continued travel of the rod is permitted when the temperature continues to change in a higher or lower direction. Further, it should be noted that this overtravel, due to the lost-motion connection, does not affect the subsequent alteration of the circuit condition when the temperature changes in direction opposite to the precedent change.

A part of the circuit to be controlled is shown by the electrical conductors 16 and 17. These two conductors are connected to terminal plates 18 and 19 fixedly secured in non-conductive relation to an insulation block as the one which covers the bottom of the housing 22 of the device. The housing is covered with a demountable cap 23. The terminal plates are metallic and function as electrical conductors. These plates are similar and each has an inner upstanding wall 20 terminating in a substantially horizontal shoulder 24 which overhangs the space below. The lower inner corner of each plate is provided with an upstanding lug 25 to which are respectively riveted in electrical connection the blades 26 and 27. The blade 26 carries a contact button 28 while the blade 27 carries a contact pin 29. Both of these blades 26 and 27 are metallic, and the blade 27 is adapted to swing to and from the blade 26 in order that the circuit may be closed upon electrical engagement of the pin 29 and button 28 or may be opened by their separation.

Figure 3:
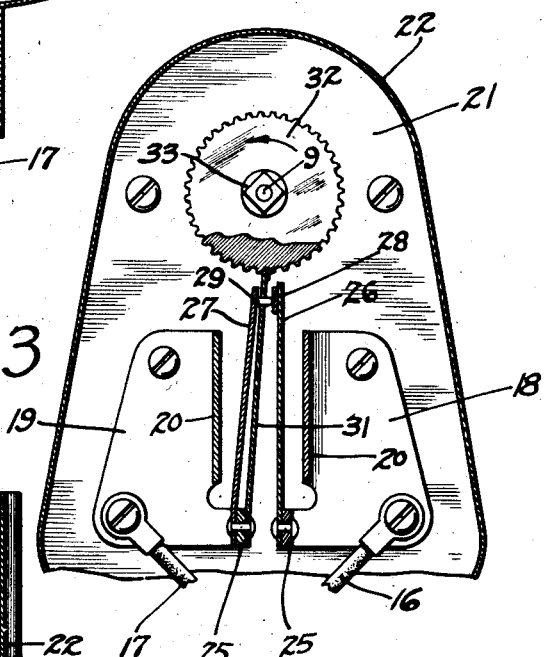
Figure 3 is a view similar to that of Figure 2 but showing a portion of the parts in circuit-closed position.
Figure 4:
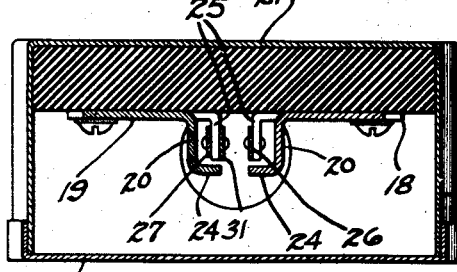
Figure 4 is a horizontal sectional view on the line 4—4 of Figure 2;

The operable connection which is provided between the thermostatic element and the circuit contacts includes a suitably flexible metallic member 31. This member may be mounted upon the lefthand lug 25 as shown in Figures 2 to 4 inclusive. It may be noted that the blade 27 is riveted to the outer face of the lug 25, while the member 31 is riveted to the inner upstanding face of the same lug 25. Adjacent the upper end of the member 31 is an aperture through which the contact pin 29 extends. The inside diameter of the aperture is considerably greater than the outside diameter of the contact pin 29 so that the resultant air gap insulates the blade 27 from the member 31. When the member 31 is moved to the left, as shown in Figure 2, it carries with it the blade 27 and thus removes the pin 29 from engagement with the contact button 28 and opens the circuit; conversely when the member 31 is moved toward the right, as shown in Figure 3, the inherent spring-tension imparted to the blade 27 carries the contact pin 29 into engagement with the button 28 and the circuit may be closed.

The operative connection between the rotatable rod 9 of the thermostatic element and the contact-moving member 31 is by means of a toothed wheel or disk 32 which is mounted in fixed relation to the rod 9 and held thereon by means of nuts and lock washers 33. The wheel 32 is therefore rotatable in response to rotation of the rod 9 by changes in temperature to which the thermally responsive portions of the thermostat are subjected. The member 31 is so mounted that its upper end normally seats within a recess between adjacent teeth on the periphery of the wheel 32. Preferably the upper end of the member 31 is bent upon itself and may be hardened to resist wear.

In the operation of this device: assuming the parts are in the position shown in Figure 2, and assuming that a rise in temperature adjacent the thermostatic element will cause rotation of the wheel 32 in a counter-clockwise direction, as indicated in Figure 3, the engagement of the upper end of the member 31 within one of the wheel recesses will cause the member to be moved to the right upon the initial movement of the wheel. This movement of the member 31 permits the blade 27 tensionably to move to the right so that after a predetermined travel thereof, the contact pin 29 engages the contact button 28 and closes the circuit. As the temperature continues to rise the wheel 32 may continue to rotate in the same direction and the member 31 passes over successive teeth until such temperature rise ceases, when the parts assume the position shown in Figure 3. Now assuming a drop in temperature, the wheel 32 will rotate in a clockwise direction, as indicated by the arrow, in Figure 2. The initial movement of the wheel 32 will carry the member 31 with it, and after a predetermined travel, the member 31 will engage the blade 27 and push it to the left so that the circuit is broken across the pin 29 and contact button 28. Further rotation of the wheel 31 after this initial movement will cause the member 31 to again pass over successive teeth 32 while still maintaining the circuit in its open position. Of course, it is obvious that the statement that the rise in 'temperature closes the circuit and the fall of temperature opens the circuit is merely for purposes of explanation because the device may be arranged so the reverse is equally true.

There is thus provided a simple efficient structure which is inexpensively produced, is positive in operation and will alter the circuit condition after a predetermined initial movement of the thermostatic element in either direction upon a change in temperature.

Having thus described my invention, what I claim as new and desire to secure by Letters Patent is:

1. An apparatus of the class described, comprising in combination, a circuit, a switch mechanism including a movable contact, a rotatable member, a thermostatic element connected with the member and adapted to transmit rotary motion thereto in response to temperature changes, a toothed disk terminally secured to the member and rotatable therewith, and a flexible member engaging said disk and adapted to actuate said movable contact to open and close the circuit after a predetermined rotation thereof in either direction, and to permit additional rotation of disk without affecting the condition of the circuit.

2. An apparatus of the class described, comprising in combination, a circuit, a switch mechanism including a pair of contacts, a rotatable member, a thermostatic element connected with the member and adapted to transmit rotary motion thereto in response to temperature changes, a disk terminally secured to the member and rotatable therewith, and a flexible member constantly peripherally engaging said disk and adapted to actuate said contacts to open and close the circuit after a predetermined rotation thereof in either direction.

3. A device of the class described including a thermal element operating a rotatable element having spaced projections, a switch, a switch control element having a portion engageable by the projections, the arrangement being such that on rotation of the projection-carrying element in either direction the switch is caused to assume a corresponding control position, and the arrangement further being such that on continued rotation of the projection-carrying element in the same direction said control element is successively released and moves against an advancing projection, but without sufficient movement to permit the switch to change its control position.

4. A device of the class described including a thermal element operating a rotatable element having spaced projections, a switch, a switch control element adapted to assume an initial position and to be yieldable for forcible movement from that position in opposite directions, and when moved in one direction adapted to close the switch and when moved in the opposite direction to open the switch, said element having a portion engageable by said projections in such manner that upon rotation of said projection-carrying element in a given direction the switch is moved to one control position, and upon continued movement of the projection-carrying element in the same direction said control element is successively engaged, moved and released, but without sufficient movement to permit the switch to change its control position.

5. A device of the class described including a thermal element operating a rotatable element having spaced projections, switch contacts one of which is automatically movable to engage the other, a switch control element arranged to occupy an initial position and requiring force to move it in opposite directions from such position, said control element having a portion engageable by the projections and said control element being substantially radially related to the axis of rotation of said projection-carrying element, the arrangement being such that on rotation of the projection-carrying element in either direction the switch is caused to assume the corresponding control position and the arrangement further being such that on continued rotation of the projection-carrying element in the same direction said control element is successively released and moves under tension against an advancing projection, but without sufficient movement to permit the switch to change its control position.

6. A device of the class described including a thermal element operating a rotatable element having spaced projections, a switch, a switch control element arranged to occupy an initial position and requiring force to move it in opposite directions from such position, said control element having a portion engageable by the projections, the arrangement being such that on rotation of the projection-carrying element in either direction the switch is caused to assume the corresponding control position and the arrangement further being such that on continued rotation of the projection-carrying element in the same direction said control element is successively released and moves under tension against an advancing projection, but without sufficient movement to permit the switch to change its control position, said control element when in unflexed position obtaining closing of the switch.

7. A device of the class described including a thermal element operating a rotatable element having spaced projections, a switch, a flexible switch control element, having a portion engageable by said projections in such manner that upon rotation in a given direction the switch will be moved to one control position, and thereafter continued movement of said projection-carrying element in the same direction obtains a ratchet-like action between the projections and the switch control element, allowing the control element to be released by one projection to move against the following projection, but without sufficient movement to permit the switch to reach its opposite control position.

8. A device of the class described including a thermal element operating a rotatable element having spaced projections, a switch, a flexible switch control element normally unflexed and adapted when sufficiently flexed in one direction to close the switch and when sufficiently flexed in an opposite direction to open the switch said switch controlling element having a portion engageable by said projections in such manner that upon rotation in a given direction the switch will be moved to one control position, the arrangement being such that upon continued rotation of the projection-carrying element the switch control element is released and moves under tension toward and against the following projection and in the opposite direction, but without sufficient movement to change that particular control position of the switch.

9. An apparatus of the class described comprising a metallic casing having a hollow extension, said extension having openings to permit circulation of air therethrough, a switch within the casing, and a switch operating element extending from the casing through the extension, and having a thermostatic element lying beyond the extension on that side opposite the casing.

10. An apparatus of the class described comprising a metallic casing having a hollow extension, said extension being open to permit circulation of air therethrough, a switch within the casing, a switch operating element extending from the casing through the extension and having a thermostatic element lying beyond the extension on that side opposite the casing.

11. A casing having a hollow extension communicating with the interior of the casing, said extension perforated to provide a circulation of air therethrough, a switch within the casing, an element journaled in the extension and projecting beyond the same at opposite sides and into the casing and connected for operating the switch when rotated, a thermostatic means encircling the switch operating element and having opposite ends attached respectively to said element and extension, the arrangement being such that circulation of air through the extension reduces to a minimum the conductivity of heat to the housing and switch.

12. A casing having a hollow extension communicating with the interior of the casing, said extension perforated to provide a circulation of air therethrough, a switch within the casing, an element journaled in the extension and projecting beyond the same at opposite sides and into the casing and connected for operating the switch when rotated, a thermostatic means encircling the switch operating element and having opposite ends attached respectively to said element and extension, and attaching means separable from the extension for securing it to a support, the arrangement being such that circulation of air through the extension reduces to a minimum the conductivity of heat to the housing and switch.

13. A casing having a hollow extension communicating with the interior of the casing, said extension perforated to provide a circulation of air therethrough, a switch within the casing, an element supported in the extension and projecting beyond the same at opposite sides and into the casing and connected for operating the switch, a thermostatic means connected to move the switch-operating element, the arrangement being such that circulation of air through the extension reduces to a minimum the conductivity of heat to the housing and switch.

In witness whereof, I have hereunto set my hand this 30th day of August, 1926.

BENJAMIN CYR.